Patented Oct. 11, 1927.

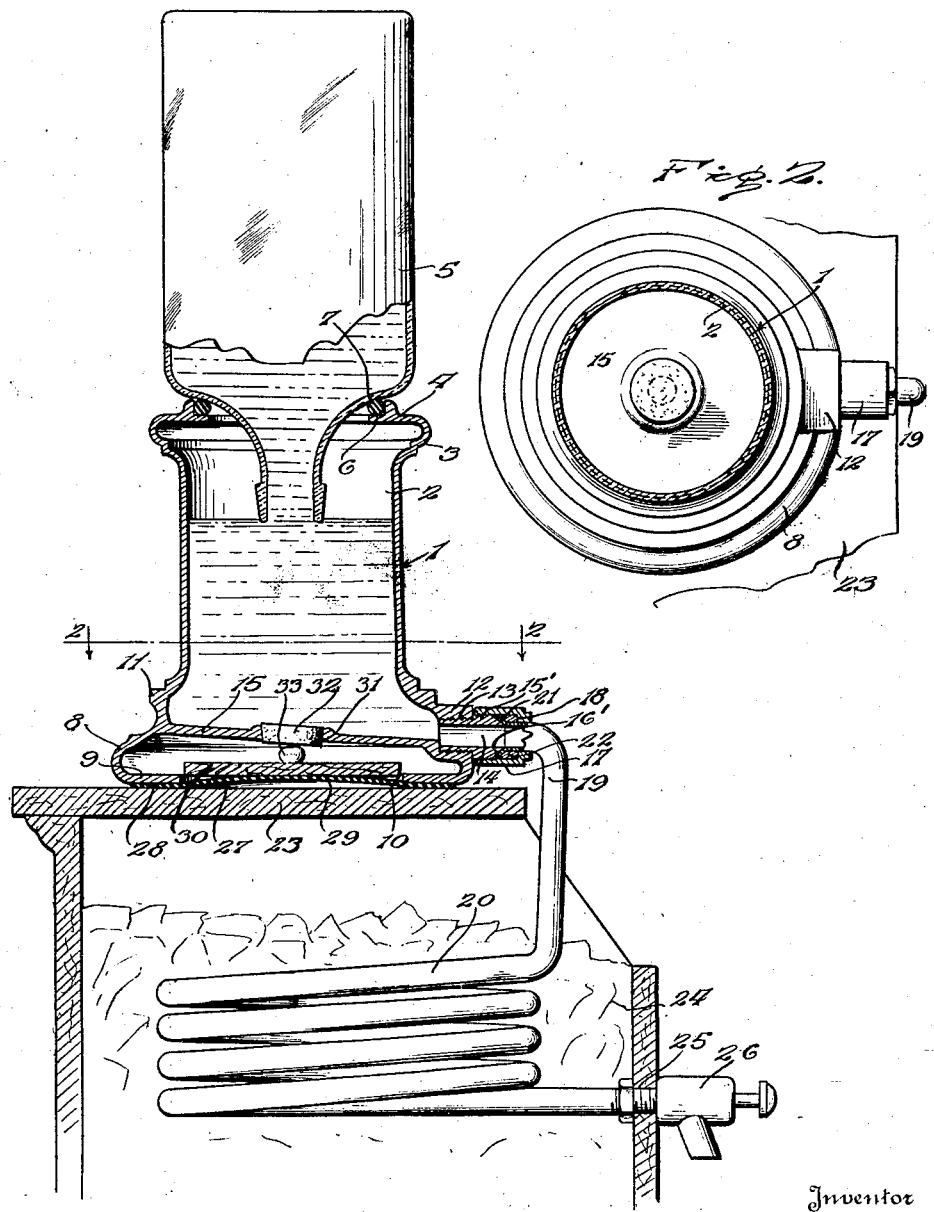
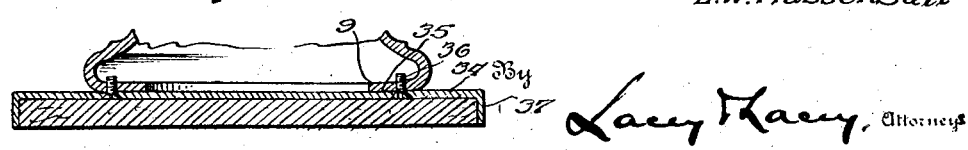

1,645,000

UNITED STATES PATENT OFFICE.

LOUIS W. HASSENSALL, OF TOLEDO, OHIO.

BEVERAGE-DISPENSING APPARATUS.

Application filed December 12, 1924. Serial No. 755,538.

This invention relates to apparatus for dispensing beverages and has as its object to provide an apparatus which may be readily installed upon any soda water fountain counter or other convenient support and, by the use of which, beverages may be dispensed at a lower maintenance cost than is possible by means of the ordinary apparatuses now employed. It is customary, in dispensing fruit juices and other beverages from large-sized bottles to invert the bottle and support the same upon a refrigerating unit having a chamber to receive the contents of the bottle and from which chamber the fruit juices or other beverages may be drawn by a suitable faucet. However, a dispensing apparatus of this type presents the disadvantage that the receiving chamber must be frequently cleaned, and, in any event, the refrigerating unit must be iced at least once a day, which is an item of expense which the present invention contemplates eliminating. In view of the disadvantage noted, the present invention has as one of its objects to provide means for the support of the bottle containing the fruit juice or other beverage in an inverted position, and delivering the beverage through a coil which is located within an ice chest or cabinet beneath the counter upon which the supporting means is mounted and in which chest the attendant at the counter ordinarily places small bottles of beverages, the coil terminating in a faucet through which the beverage may be drawn, and the support constituting a temporary container for the beverage delivered from the bottle. Inasmuch as a druggist or confectioner is required, in any event, to keep bottles of beverages in an ice chest or other compartment beneath the counter, and must daily ice the said chest or compartment, the provision of a cooling coil, such as contemplated by the invention, and the arrangement of the coil within said ice chest or compartment, effects, as will be readily understood, an economy in ice as well as obviating the necessity of icing not only the compartment but also the refrigerating unit ordinarily employed in supporting large bottles of beverages.

Another object of the invention is to provide novel means whereby the combined temporary container and support for the bottle may be held against displacement upon the counter without the necessity, however, of in any way mutilating the counter in obtaining this result.

Another object of the invention is to so form the beverage container at its top as to provide for the secure support of the inverted bottle of beverage and cushion the bottle so that there will be no liklihood of fracture of the same at the time the same is inverted.

Another important object of the invention is to so form the container, interiorly, as to provide against the accumulation of any sediment in the bottom thereof, so that it will be unnecessary to frequently wash out the container.

In the accompanying drawings:

Figure 1 is a view partly in elevation and partly in section, illustrating the dispensing apparatus embodying the invention.

Figure 2 is a horizontal sectional view taken substantially on the line 2—2 of Figure 1, looking in the direction indicated by the arrows.

Figure 3 is a vertical front to rear sectional view through the base portion of the container and the counter upon which the same is mounted, the view illustrating a modified means for preventing displacement of the container with relation to the counter.

In the drawings, the temporary container for the beverage is indicated in general by the numeral 1, and the same is preferably of cast metal and lined with porcelain or glass and enameled exteriorly. The container comprises a hollow cylindrical body 2 which has its upper portion circumferentially bulged, as indicated by the numeral 3, so as to provide an ornamental shoulder and an inwardly projecting substantially horizontal annular supporting flange 4 which defines the mouth of the container and which, likewise, constitutes a means for supporting the beverage bottle, which is indicated by the numeral 5. The flange 4 is formed with a continuous rabbet 6 in which is fitted a ring 7 of soft rubber, the ring being preferably circular in cross section and of a diameter to support the shoulder of the bottle 5 without likelihood of the bottle coming into contact with the upper side of the flange 4.

The base of the container body 2 is indicated by the numeral 8 and the said base constitutes an integral part with the wall of the body and is outwardly bulged along vertically curved lines, as illustrated in Figure 1, and has a horizontally disposed inwardly projecting annular flange 9 defining an opening indicated by the numeral 10. Preferably, the wall 2 is formed, above the bulge 8, with a circumferentially extending outstanding bead 11, and at one side of the body 2, namely that side which is to be presented rearwardly when the apparatus is disposed upon a counter, the said body is formed with a preferably round boss indicated by the numeral 12, the boss being, in turn, drilled and tapped to provide a threaded opening 13 and a nipple 14 is threaded into the opening 13 and has one end projecting a short distance beyond the vertical face of the boss 12 for a purpose to be presently explained.

The body 2 is formed within its base portion with a bottom which is indicated by the numeral 15, and by reference to Figure 1 of the drawings, it will be observed that this bottom is inclined downwardly and rearwardly from the forward side of the container toward the rear side thereof, so that no sediment will collect upon the bottom but will drain off through the nipple 14, it being observed that the lower side of the bore of the nipple is located slightly below the inclined plane occupied by the upper surface of the bottom 15, as indicated by the numeral 16, so as to insure of all of the beverage being exhausted from the container when occasion requires, and thereby insure of freshness of the contents by avoiding the slightest accumulation of residue.

The nipple 14 is exteriorly threaded as indicated by the numeral 15', at its projecting outer end, and this end is likewise exteriorly of conical form at its extremity, as indicated by the numeral 16'. The numeral 17 indicates a coupling which is interiorly threaded at one end and at its other end is reduced in diameter to provide a shoulder 18, the reduced end of the coupling being rotatably fitted to one end of a block tin pipe 19 which is formed to provide a coil 20. The end of the pipe is flared, as at 21, and a collar 22 preferably of brass is fitted to the said end of the pipe and is interiorly flared at one end to seat behind the flared end of the pipe, the other end of the collar engaging against the shoulder 18 of the coupling 17 and said coupling being threaded onto the projecting end of the nipple 14 and tightened to tightly clamp the flared portion of the pipe between the conical extremity of the nipple and the flared interior of the collar 22, and thereby provide a fluid-tight connection between the pipe and the nipple.

The apparatus is supported upon the top of a counter, which is indicated in the drawings by the numeral 23, and arranged beneath the counter top is the usual ice chest indicated by the numeral 24, in which bottled beverages are ordinarily packed for cooling. The pipe 19 is led downwardly beside the rear edge of the counter top and into the ice chest 24, where it is formed into the coil 20, as before stated, and the lower end of this coil is extended rearwardly through an opening 25 formed in the rear wall of the ice chest and a faucet 26 is fitted in an appropriate manner to the said end of the coil.

At this point, it will be evident that no refrigerating chamber or other medium is employed in connection with the container 1 but that advantage is taken of the convenient location of the ice chest beneath the counter top, to serve as a cooling medium for the beverage passing through the coil 20, with the resultant economy heretofore referred to.

In that form of the invention shown in Figures 1 and 2 of the drawings, the means provided for preventing displacement of the container 1 when disposed upon a counter top, comprises a pad 27 of soft rubber having a flat circumferential marginal portion or rim 28 surrounding an upwardly bulged intermediate portion 29, the convex side of which is presented upwardly and the concave side toward the surface of the counter top. The dimensions of the pad 27 are such that when the base flange 9 of the container is disposed upon the marginal portion 28 of the pad, the intermediate portion 29 thereof will project upwardly a short distance into the opening 10. Arranged within the base of the body 2 beneath the bottom 15 and resting upon the intermediate portion 29 of the pad 27, is a rectangular wood disk 30 of slightly less diameter than the opening 10, and the said bottom 15 is formed approximately centrally with an opening 31 normally closed by a cork 32 which, however, may be removed, when the container is empty and at the time the container is installed upon the counter 23, so as to permit of downward pressure being exerted upon the disk 30, by the aid of a knob 33 thereon, to depress the upwardly bulged intermediate portion 29 of the pad 27, thereby expelling air from the space beneath the said portion of the pad, to facilitate which, the base of the container is slightly raised at one side by the insertion of some instrument which can be easily removed after the air has been expelled. When the disk 30 is relieved of pressure, the tendency of the bulged intermediate portion 29 to reassume its fully bulged form, will result in a partial vacuum being created and thus cause firm adherence of the pad, at its marginal portion, to the counter. The cork 32 is, of course, replaced after the container has been installed, and the apparatus as a whole is then ready for use.

In the modified form of the invention shown in Figure 3 of the drawings, a strip 34 of metal is seated in notches 35 formed in the under side of the base flange 9 of the container and secured in place by screws or bolts 36, or any other suitable fastening elements, and the end portions of this strip or bar are bent downwardly at right angles as at 37, so as to engage the front and rear edges of the counter top, thereby preventing any displacement of the container.

Having thus described the invention, what I claim is:

A dispensing stand including an ice receptacle having a top support and a wall formed with an ice filling opening at the top, a cooling coil in said receptacle having one end extending upwardly through the opening and provided with a coupling above the support for attachment to a source of supply, the coil having a dispensing tap through the wall of the ice receptacle.

In testimony whereof I affix my signature.

LOUIS W. HASSENSALL. [L. S.]